United States Patent
Athineos et al.

(10) Patent No.: US 10,861,463 B2
(45) Date of Patent: Dec. 8, 2020

(54) METHOD FOR SPEECH PROCESSING AND SPEECH PROCESSING DEVICE

(71) Applicant: Sennheiser electronic GmbH & Co. KG, Wedemark (DE)

(72) Inventors: Marios Athineos, San Francisco, CA (US); Michael Lee, San Carlos, CA (US)

(73) Assignee: Sennheiser electronic GmbH & Co. KG, Wedemark (DE)

(*) Notice: Subject to any disclaimer, the term of this patent is extended or adjusted under 35 U.S.C. 154(b) by 172 days.

(21) Appl. No.: 15/865,375

(22) Filed: Jan. 9, 2018

(65) Prior Publication Data

US 2019/0214018 A1 Jul. 11, 2019

(51) Int. Cl.
| | |
|---|---|
| *G10L 17/00* | (2013.01) |
| *H04M 3/51* | (2006.01) |
| *G06F 16/60* | (2019.01) |
| *G10L 15/04* | (2013.01) |
| *G10L 17/02* | (2013.01) |
| *H04M 3/493* | (2006.01) |

(52) U.S. Cl.
CPC ............ *G10L 17/00* (2013.01); *G06F 16/60* (2019.01); *G10L 15/04* (2013.01); *G10L 17/02* (2013.01); *H04M 3/5166* (2013.01); *H04M 3/4936* (2013.01); *H04M 2203/306* (2013.01)

(58) Field of Classification Search
CPC ....... G10L 17/005; G10L 17/02; G10L 15/04; G06Q 40/02; H04M 3/5166; G06F 16/60
See application file for complete search history.

(56) References Cited

U.S. PATENT DOCUMENTS

| | | | | |
|---|---|---|---|---|
| 5,754,972 | A * | 5/1998 | Baker | G10L 15/04 |
| | | | | 704/2 |
| 6,862,713 | B1 * | 3/2005 | Kraft | G06F 16/3325 |
| | | | | 715/728 |
| 9,177,174 | B1 * | 11/2015 | Shoemaker | H04L 63/08 |
| 9,307,084 | B1 * | 4/2016 | Pycko | H04M 3/5166 |
| 9,544,438 | B1 * | 1/2017 | Andraszek | G10L 21/06 |
| 10,002,639 | B1 * | 6/2018 | Gaeta | G10L 15/02 |
| 10,387,548 | B2 * | 8/2019 | Avore | G06F 17/2247 |
| 10,529,336 | B1 * | 1/2020 | Matthews | G06F 16/635 |
| 2003/0185232 | A1 * | 10/2003 | Moore | G06Q 20/085 |
| | | | | 370/465 |

(Continued)

*Primary Examiner* — Daniel C Washburn
*Assistant Examiner* — Oluwadamilola M Ogunbiyi
(74) *Attorney, Agent, or Firm* — Haug Partners LLP

(57) ABSTRACT

During telephone calls in a public space, users may be reluctant to provide private or secret information, due to the risk of eavesdropping. A hands-free solution for entering secret information to electronic speech communication devices is based on speech processing. A method for speech processing a voice input data stream comprises steps of scanning the voice input data stream and detecting a spoken delimiter therein, determining a predefined audio sample corresponding to the detected spoken delimiter, inserting the determined predefined audio sample into the voice input data stream at the spoken delimiter, wherein a substituted voice data stream is obtained and wherein speech portions of the voice input data stream at least before the spoken delimiter remain in the substituted voice data stream, and providing the substituted voice data stream for output towards a recipient.

21 Claims, 2 Drawing Sheets

(56) References Cited

U.S. PATENT DOCUMENTS

| | | | | |
|---|---|---|---|---|
| 2004/0030750 A1* | 2/2004 | Moore | ............... | H04L 12/14 709/204 |
| 2004/0209656 A1* | 10/2004 | Kitami | ............... | H04M 1/2535 455/569.1 |
| 2005/0195798 A1* | 9/2005 | Kirkland | ............... | H04M 3/42221 370/352 |
| 2006/0190263 A1* | 8/2006 | Finke | ............... | G06Q 50/22 704/270 |
| 2006/0285654 A1* | 12/2006 | Nesvadba | ............... | G06F 17/27 379/67.1 |
| 2008/0133244 A1* | 6/2008 | Bodin | ............... | G10L 15/22 704/275 |
| 2008/0167879 A1* | 7/2008 | Du Bois | ............... | G10L 15/04 704/278 |
| 2010/0017212 A1* | 1/2010 | Attwater | ............... | G10L 15/08 704/275 |
| 2010/0162355 A1* | 6/2010 | Zimmerman | ............... | G06F 21/6245 726/2 |
| 2010/0214476 A1* | 8/2010 | Miyamoto | ............... | H04N 21/440236 348/468 |
| 2011/0173539 A1* | 7/2011 | Rottler | ............... | G06F 3/0482 715/727 |
| 2011/0218798 A1* | 9/2011 | Gavalda | ............... | G10L 17/00 704/201 |
| 2012/0143596 A1* | 6/2012 | Bhogal | ............... | H04M 1/72522 704/9 |
| 2012/0144455 A1* | 6/2012 | Lazar | ............... | G06F 21/31 726/4 |
| 2013/0085757 A1* | 4/2013 | Nakamura | ............... | G06F 3/167 704/254 |
| 2013/0266127 A1* | 10/2013 | Schachter | ............... | G10L 25/48 379/88.01 |
| 2015/0100302 A1* | 4/2015 | Flaks | ............... | G10L 15/1822 704/9 |
| 2015/0127340 A1* | 5/2015 | Epshteyn | ............... | G10L 15/26 704/235 |
| 2015/0143413 A1* | 5/2015 | Hall | ............... | G06Q 30/0271 725/34 |
| 2015/0325232 A1* | 11/2015 | Tachibana | ............... | G10L 13/02 704/268 |
| 2016/0379639 A1* | 12/2016 | Weinstein | ............... | G10L 15/063 704/235 |
| 2018/0081622 A1* | 3/2018 | Taki | ............... | G06F 3/167 |
| 2018/0130465 A1* | 5/2018 | Kim | ............... | G10L 15/22 |
| 2018/0190270 A1* | 7/2018 | Chen | ............... | G10L 15/1815 |
| 2018/0240460 A1* | 8/2018 | Matsumoto | ............... | G10L 21/00 |
| 2018/0268824 A1* | 9/2018 | Zuo | ............... | H04L 9/0825 |
| 2019/0013038 A1* | 1/2019 | Thomson | ............... | H04L 63/0407 |
| 2019/0042645 A1* | 2/2019 | Othmer | ............... | G06F 16/685 |
| 2019/0074003 A1* | 3/2019 | Guthery | ............... | G10L 15/285 |
| 2019/0164539 A1* | 5/2019 | Schmidt | ............... | G06F 40/284 |
| 2019/0189116 A1* | 6/2019 | Li | ............... | G10L 15/187 |
| 2019/0246075 A1* | 8/2019 | Khadloya | ............... | H04N 7/183 |

* cited by examiner

METHOD FOR SPEECH PROCESSING AND SPEECH PROCESSING DEVICE

The invention relates to a method for speech processing and to a speech processing device.

BACKGROUND

A lot of information is exchanged via speech communication using telephones or other electronic speech communication services, such as voice messages. Also voice control is becoming increasingly important for various kinds of devices or services. In such cases, speech often includes private or secret information. For example, a user of a telephone banking service may be required to tell his bank account number or a password, which may be heard by eavesdroppers on the near-end. Therefore, users in a public space may have privacy concerns when providing private or secret information via speech communication. Alternative known solutions for various devices use a combination of voice input and other input/output modes. Some systems keep certain data to be communicated private by requiring non-verbal modes such as text or screen input. For example, a bank may request that a user enters a Social Security Number (SSN) via the number keypad on the phone rather than using voice. However, this requires the user to type on a keyboard. A hands-free solution for entering secret information would be desirable.

SUMMARY OF THE INVENTION

Therefore a problem to be solved is to provide to users of electronic speech communication devices, particularly in a public space, a hands-free solution for entering secret information to their electronic speech communication device.

At least this problem is solved by a method for speech processing according to claim 1. Further, the problem is solved by a speech processing device according to claim 9.

According to the invention, a combination of keyword detection, an audio database, and audio signal processing for audio splicing or audio synthesis is used. The keyword or delimiter triggers insertion of secret audio information in the data stream, without requiring the user to pronounce the secret information.

In one embodiment, the invention relates to a method for automatic speech processing of a voice input data stream originating from a talking user in electronic conversation and being transmitted to a recipient, wherein the method comprises scanning the voice input data stream and detecting a spoken delimiter therein by an audio scan and detection unit, determining, by an audio substitution determination unit, a predefined audio sample corresponding to the detected spoken delimiter, inserting, by an audio insertion unit, the determined predefined audio sample into the voice input data stream at the spoken delimiter, wherein a substituted voice data stream is obtained, and wherein speech portions of the voice input data stream at least before the spoken delimiter remain in the substituted voice data stream, and providing the substituted voice data stream for output towards the recipient.

In another embodiment, the invention relates to a speech processing device adapted for processing a voice input data stream that originates from a talking user in electronic conversation, wherein the speech processing device comprises an audio scan and detection unit adapted for scanning the voice input data stream and for detecting a spoken delimiter therein, an audio substitution determination unit adapted for determining a prerecorded audio sample corresponding to the detected spoken delimiter, an audio insertion unit adapted for inserting the determined prerecorded audio sample at the spoken delimiter in the voice input data stream, wherein a substituted voice data stream is obtained, and wherein speech portions of the voice input data stream at least before and after the spoken delimiter remain in the substituted voice data stream, and an audio output for providing the substituted voice data stream towards a recipient.

Advantageously, the invention provides a convenient and user-friendly hands-free solution to the above-mentioned problem, and allows a natural conversational flow without structured dialog insertion points. Also, the user is not required to switch modes during the interaction. Further, the present invention may reduce the user's privacy concerns.

Further advantageous embodiments are disclosed in the drawings and in the detailed description.

DETAILED DESCRIPTION

The present disclosure enables a service that may reduce privacy concerns of users that use speech communications devices while in a public space. The approach entails the deployment of a component that is capable of detecting specific spoken delimiters and keywords in an input data stream and inserting a corresponding audio sample into the audio stream before the audio is routed to its final destination. The audio sample may also substitute partly or fully the spoken delimiter. In any case, the inserted or substituting audio sample is seamlessly integrated into the audio signal. That is, speech that is in the data stream before the spoken delimiter is not modified. Also speech that is in the data stream after the inserted or substituting audio sample is not modified. The resulting audio data stream is referred to as substituted audio data stream herein.

In some embodiments, the above-mentioned component is an inline software component. In some embodiments, this component is deployed on a phone, where it has access to the input audio stream and then splices replaced audio into the output stream, which is passed to the mobile network thereafter. In other embodiments, this component is a functionality implemented as a cloud/internet service, wherein the input audio is sent from the originating device to the service. Parsing and audio insertion/substitution takes place before the substituted audio data stream is routed to its final destination. In any case, the source of the audio stream is a human user, while the final destination could be another human user or a machine system that accepts audio input.

Figure 1:
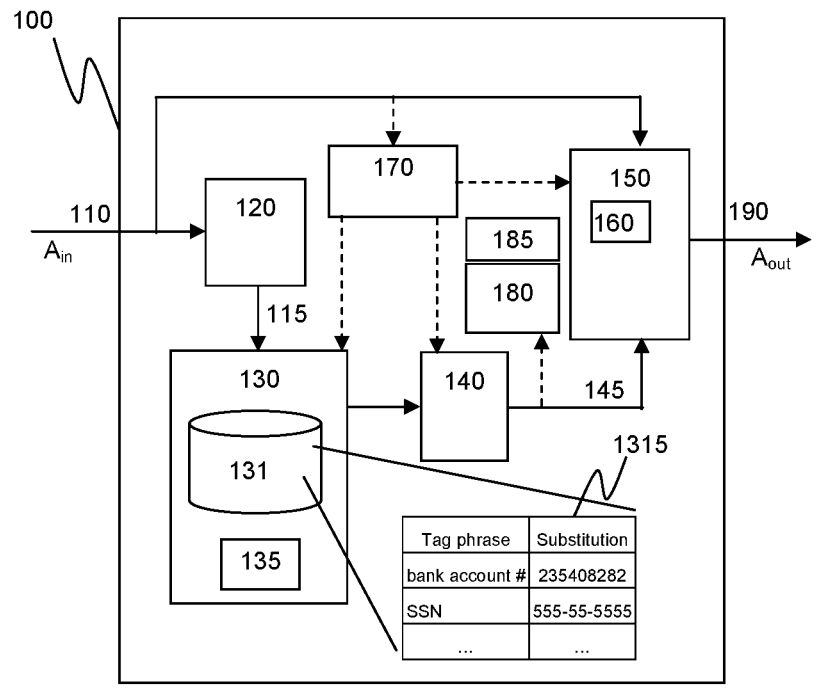
FIG. 1 a block diagram of a device for speech processing.

FIG. 1 shows exemplarily a block diagram of a speech processing device 100 adapted for processing a voice input data stream $A_{in}$ originating from a talking user who uses an electronic device in conversation. In principle, the device 100 comprises at least an audio scan and detection unit 120, an audio substitution determination unit 130, and an audio insertion unit 150.

The audio scan and detection unit 120 scans the voice input data stream $A_{in}$ and detects a spoken delimiter therein. The spoken delimiter may begin with a specific predefined utterance or initial tag <init_tag>, such as "hashtag" or "Doctor Fritz", followed by a user supplied tag <user_tag>, such as e.g. "bank account number". The initial tag may set or raise the detector's attentiveness level for analyzing the user supplied tag. In an embodiment, the initial tag is generic for all users (except for voice verification, in some embodiments, see below) while the user supplied tag is preferably user specific. In another embodiment, which may yield better recognition rates, also the initial tag is user specific. In any case, the user supplied tag is only detected in combination with the initial tag; without the initial tag, the user supplied tag is not a delimiter but just spoken conversation. The audio scan and detection unit 120 may also map the detected spoken delimiter to a corresponding identifier 115. The identifier corresponding to the spoken delimiter, or the spoken delimiter itself, is provided to the audio substitution determination unit 130.

The audio substitution determination unit 130 determines 220 a prerecorded audio sample corresponding to the detected spoken delimiter, and provides it to the audio insertion unit 150. The prerecorded audio sample may have been recorded by the user earlier, so that the user knows which spoken delimiter will lead to the determining of a currently required, specific prerecorded audio sample. For example, if the user supplied tag in the spoken delimiter is "bank account number", the user knows that an audio sample comprising his previously recorded bank account number will be determined. However, the prerecorded audio sample may be kept secret from other persons that are near the user, since the user is not required to say it loud during a telephone call.

The audio insertion unit 150 inserts the determined prerecorded audio sample at the spoken delimiter in the voice input data stream, so that a substituted voice data stream $A_{out}$ is obtained. Advantageously, speech portions of the voice input data stream before and after the spoken delimiter may remain in the substituted voice data stream, so that a natural conversational flow without structured dialog insertion points can be achieved. In some embodiments, the voice input data stream may be delayed by a delay unit 160 before the insertion or substitution. Finally, the substituted voice data stream $A_{out}$ is provided at an audio output 190 for further processing or for transmission to the recipient. Thus, although the user publicly only utters the spoken delimiter during a telephone call, the recipient will hear the inserted prerecorded audio sample and get the additional secret information.

In different embodiments, the spoken delimiter may or may not be transmitted to the recipient. In an embodiment, the audio sample is recorded in the natural voice of the user.

In another embodiment, the audio sample is obtained by speech synthesis, e.g. from parameterized data that may be stored in the audio insertion determination unit 130.

In an embodiment, the audio insertion determination unit 130 comprises a substitution database 131 adapted for storing at least one pair of a spoken delimiter, or a respective identifier, and sound data of a corresponding substitution audio sample. In an embodiment, the audio insertion determination unit 130 comprises a recording control unit 135 adapted for recording in the substitution database 131 the sound data of at least the substitution audio sample. In an embodiment, also sound data of the spoken delimiter (or at least the user tag) may be recorded. In another embodiment, a respective identifier of the spoken delimiter is stored together with the substitution audio sample in the substitution database 131. For example, a table 1315 comprising two or more spoken delimiters (or tag phrases) and their respective substitution audio samples may be stored in the substitution database 131. In an embodiment, the table 1315 comprises only the user tag portions of the spoken delimiters and their corresponding substitution audio samples.

In an embodiment, the speech processing device 100 further comprises a speech renderer unit or speech synthesizer 140 adapted for rendering the substitution audio sample from sound data retrieved from the substitution database 131. The rendered substitution audio sample 145 is provided at least to the audio insertion unit 150. It may also be provided to the user for listening. In an embodiment, the speech processing device 100 further comprises a replay unit, e.g. as part of a confirmation control unit 180, that allows replaying the determined and rendered audio sample to the user while inserting it into the audio stream. This provides additional feedback to the user. Additionally, in one embodiment the user may intervene in case of an error, e.g. by saying "stop" or by uttering any command during the replay. The confirmation control unit 180 may detect the user intervention and terminate at least the insertion thereupon. The intervention command may or may not be transmitted to the recipient.

In an embodiment, the device further comprises a replay control unit 185, which prevents playback of the insertion via speakerphones at the user's side. This provides additional security against eavesdropping.

In an embodiment, the device 100 further comprises a voice verification unit 170 adapted for verifying that the voice input data stream $A_{in}$ corresponds to the voice of a predefined user. The voice verification unit 170 may identify the user also by other means, e.g. a fingerprint. Depending on the verification result, other modules such as the audio insertion unit 150, the audio substitution determination unit 130 or the speech renderer unit 140 may be enabled or disabled. For example, the audio insertion unit 150 may be enabled if the verification is successful, and it may be disabled otherwise, so that the audio sample is not inserted into the voice output data stream. This prevents a misuse by others who may have eavesdropped and heard a user's spoken delimiter, and thus provides an additional level of security for the user.

Figure 2:
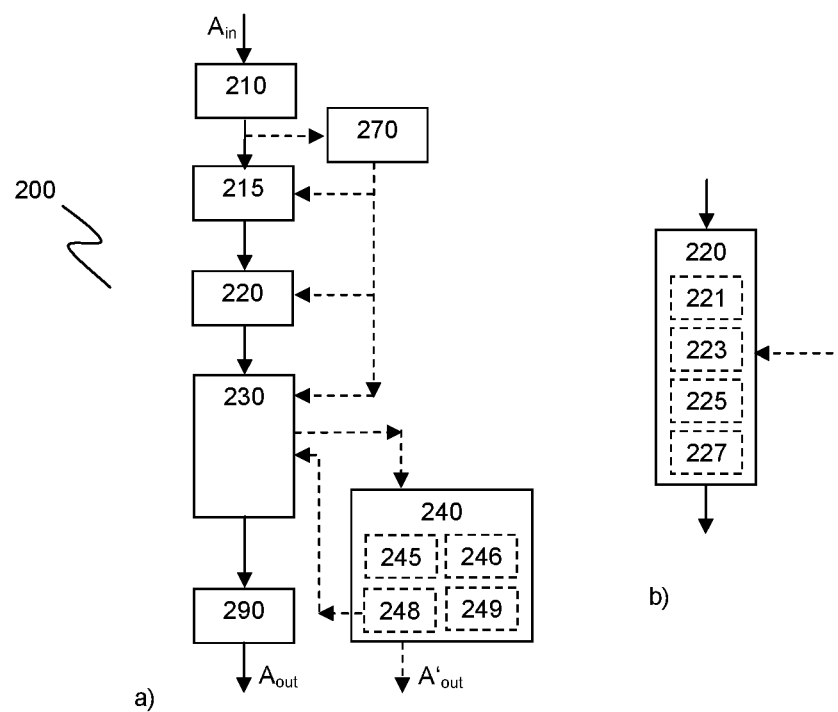
FIG. 2 a flow-chart of a method for automatic speech processing.

FIG. 2 a) shows a flowchart of a method 200 for automatic speech processing of a voice input data stream $A_{in}$ in various embodiments. The voice input data stream may originate from a talking user in conversation using an electronic device, and be transmitted to a recipient, which may be human or a machine. The method comprises steps of scanning 210 the voice input data stream and detecting 215 a spoken delimiter therein, which may be performed by the audio scan and detection unit 120. The method further comprises steps of determining 220 a predefined audio sample corresponding to the detected spoken delimiter, which may be performed by the audio substitution determination unit 130, and inserting 230 the determined predefined audio sample into the voice input data stream at the spoken delimiter. This may be performed by the audio insertion unit 150. As a result, a substituted voice data stream is obtained, wherein speech portions of the voice input data stream at least before and after the spoken delimiter remain in the substituted voice data stream. The spoken delimiter itself may or may not remain included therein. Finally, the substituted voice data stream $A_{out}$ is provided 290 for output towards the recipient.

In an embodiment, the method 200 further comprises a step of verifying 270 that the voice input data stream originates from a predefined user, wherein voice characteristics of the voice input data stream $A_{in}$ are compared with voice characteristics of the predefined user that have been previously stored or analyzed. This step may be performed by a voice verification unit 170. One or more other steps 215,220,230, preferably at least the step of inserting 230 the determined predefined audio sample, is disabled if said verifying fails. Alternatively in this case, the method may be terminated. Otherwise, if the verification succeeds, these steps are enabled.

In an embodiment, the method 200 further comprises a step of replaying 240 the determined and inserted audio sample to the user while transmitting it to the recipient. This has the advantage that the user can hear the inserted audio sample, verify it and continue talking thereafter seamlessly. The inserted audio sample may also be provided as a separate output $A'_{out}$ to the user, e.g. in cases where the user's voice is usually not fed back to the user. In one embodiment, the spoken delimiter is removed from the substituted voice data stream $A_{out}$. This may keep the spoken delimiter secret from the recipient and may also be more convenient for the recipient, but may require delaying the data stream at least for the duration of detecting the spoken delimiter. In another embodiment, the spoken delimiter remains at least partly in the substituted voice data stream, and the determined predefined audio sample is inserted directly after the spoken delimiter. Due to the fixed predefined initial tag, machine recipients may be trained to ignore the spoken delimiter.

Another advantage of the fact that the user may verify the inserted audio sample is that the user may intervene in case of an error. E.g. if the user erroneously used an unintended tag phrase, he or she may recognize the error while listening to the inserted audio sample, and interrupt the system. In one embodiment, the method further comprises a confirmation control with steps of detecting 245 a user intervention while replaying and inserting the audio sample, as described above, and terminating 248 the replaying 240 and/or the inserting 230 upon the detection.

In one embodiment a replay control unit 185 may detect 246 that the electronic conversation is replayed over a speakerphone at the talking user's side, and thereupon prevent the audio sample replay, e.g. switch off 249 the speakerphone at least during the replay.

As shown in FIG. 2 b), the step of determining 220 the predefined audio sample may comprise, in an embodiment, comparing 221 the spoken delimiter with one or more tag phrases retrieved from a substitution database 131, detecting 223 a tag phrase that matches the spoken delimiter, and retrieving 225 from the substitution database at least one substitution audio sample corresponding to the detected matching tag phrase. The tag phrases and/or the substitution audio samples may comprise voice recordings of the user. Alternatively, the substitution audio sample retrieved from the substitution database may comprise data formatted as speech synthesizer input data in an embodiment, including e.g. parametric data. In this case, the method may comprise rendering 227 the speech synthesizer input data by a speech synthesizer unit 140 to obtain audio data for the substitution audio sample.

Figure 3:
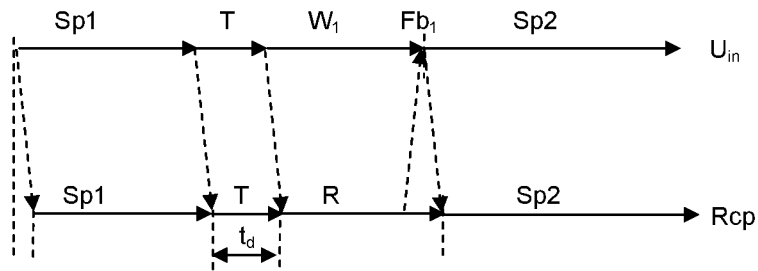
FIG. 3 a timeline of speech processing in a first embodiment.

FIG. 3 shows a timeline of speech processing, in a first embodiment. The upper line labelled $U_{in}$ refers to speech input from the user while the lower line labelled Rcp represents output to the recipient (and potentially also back to the user, e.g. if the telephone replays his or her own voice to the user). While the user speaks, a first portion of speech Sp1 is transmitted with an inevitable little delay to the recipient, as usual. When the user utters the spoken delimiter or tag T, it is detected, as described above. In this example the tag T is also transmitted to the recipient. Immediately after the detection, a substitution audio sample R is determined, replayed and inserted in the voice data stream to obtain the substituted voice data stream. The latter is transmitted to the recipient, as shown on the lower timeline Rcp. In this example, the inserted audio sample is not replayed to the user, so that the user may have to guess when it is over and wait during this time $W_1$. The user may get any feedback, e.g. an audible feedback signal $Fb_1$ such as a beep, when the replay of the substitution audio sample is over or nearly over. He or she may therefore continue talking, possibly after a short reaction time (not shown), and subsequent portions of speech Sp2 are again transmitted to the recipient without modification, as usual. It may also be advantageous to provide feedback to the user whenever a spoken delimiter has been detected, e.g. an audible feedback signal such as a beep.

Figure 4:
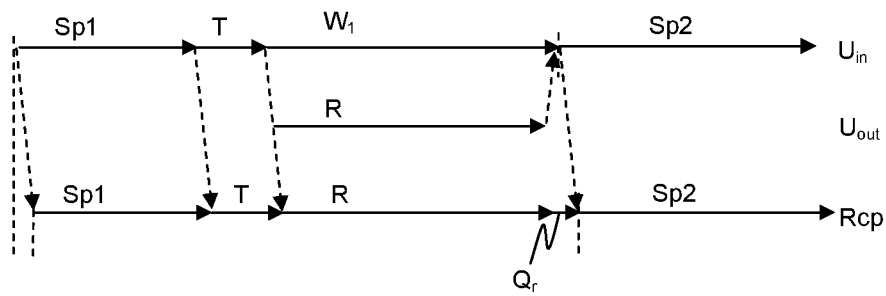
FIG. 4 a timeline of speech processing in a second embodiment.

FIG. 4 shows a timeline of speech processing in a second embodiment. Additionally, a third line $U_{out}$ is depicted between the upper and the lower line, representing sound output back towards the user. In this example, the substitution audio sample R is also replayed to the user, so that the user may wait $W_1$ listening and realize when the insertion is over. After a short reaction time, which may at the recipient result in a short period of silence $Q_1$ after the substitution audio sample R, the user may continue talking. The subsequent portions of speech Sp2 are again transmitted without modification to the recipient. The user may also continue talking shortly before the replay of the substitution audio sample is over, so that the short period of silence $Q_1$ after the substitution audio sample R is prevented and the conversational flow sounds even more natural for the recipient. However, the user should not continue talking too early, since in one embodiment the system might then interpret the subsequent speech Sp2 as a user intervention and terminate the insertion.

In an example, where the hashtag identifier is "Dr Fritz" and the user tag is "bank account", the user may say during the phone call "I will now give you my Dr Fritz bank account - - - and transfer a hundred Euros." The speech processing system translates the spoken delimiter comprising the hashtag identifier and the user tag into the actual bank account number and inserts it immediately, so that the far-end recipient may hear (with the inserted substitution audio sample included in angle brackets) "I will now give you my Dr Fritz bank account <235408282> and transfer a hundred Euros.". As described above, in some embodiments at least the substitution audio sample "<235408282>" may also be replayed to the user.

In another example, the transmission may be delayed so that the spoken delimiter can be eliminated. The user may say during the phone call "I will now give you my bank account Dr Fritz bank account and transfer a hundred Euros", and the speech processing system replaces the spoken delimiter by the actual bank account number. In this case, the far-end recipient after a delay may hear "I will now give you my bank account <235408282> and transfer a hundred Euros." Again, it may be advantageous to replay at least the substitution audio sample "<235408282>" to the user.

Figure 5:
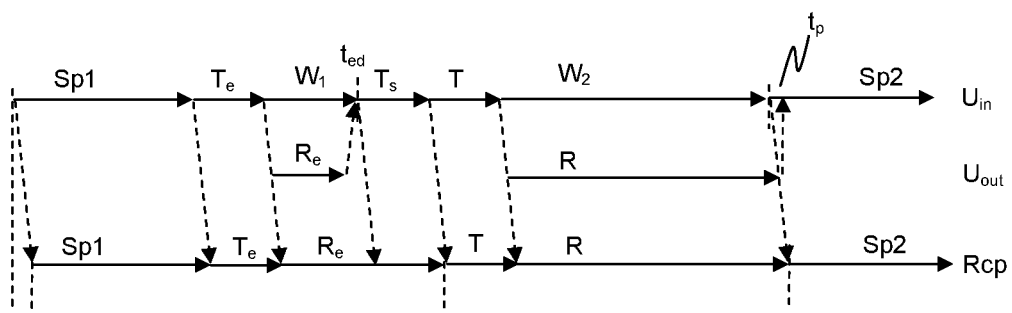
FIG. 5 a timeline of speech processing with an error correction in a third embodiment.

FIG. 5 shows a timeline of speech processing with an error correction, in a third embodiment. After the user uttered a wrong tag $T_e$ (i.e. an existing but unintended tag), the corresponding erroneous substitution audio sample $R_e$ is determined, inserted and replayed. However, since the substitution audio sample $R_e$ is replayed to the user, he or she may interrupt the replay and insertion at $t_{ed}$ by saying something, like e.g. "Stop". In one embodiment, the user may say anything and the system will react immediately. In another embodiment, the system reacts only on certain predefined stop words, so that it needs some time $T_s$ to detect a stop word. Consequently, the recipient may also hear at least a part of the replayed erroneous substitution audio sample $R_e$. However, usually human recipients as well as machine recipients may realize that the substitution audio sample is not correct. After the interrupting speech portion $T_s$, the user may in this example immediately utter the correct intended tag T, and the corresponding intended substitution audio sample R is determined, inserted and replayed. The user may also continue talking a short time $t_p$ before the end of replaying the substitution audio sample $R_i$ as mentioned above.

Generally, it may be advantageous to detect if the telephone conversation takes place over speakerphone at the user side, and switch the speakerphone off upon detection of the spoken delimiter or during the insertion of the substitution audio sample. Otherwise the secret substitution audio sample may be heard by eavesdroppers on the near-end.

Note that FIGS. 3-5 show the timelines only in principle. The lengths of the tags, substitution audio samples and delays relative to each other may be different.

In an embodiment, the user may perform a training phase for configuring and managing a set of delimiters, audio tags, and audio items to be inserted. These may be recorded in the substitution database. E.g. the user may record his or her own delimiter utterance, so that the system better recognizes the spoken delimiters.

The speech processor 100, in embodiments, can be built on any number of technologies spanning from conventional voice detection signal processing techniques to machine learning based approaches. In some embodiments, one or more of the above-described units such as audio scan and detection unit 120, audio substitution determination unit 130, recording control unit 135, speech renderer unit or speech synthesizer 140, audio insertion unit 150, delay unit 160, voice verification unit 170, confirmation control unit 180 and replay control unit 185 can be partly or completely implemented by one or more processors, e.g. signal processors and/or speech processors, that may be configured by software.

In an embodiment, the invention relates to a non-transitory computer-readable storage medium having stored thereon instructions that when executed on a computer cause the computer to perform a method for speech processing as disclosed above.

The invention is advantageous for speech communication systems that desire a certain level of privacy in general, and in particular for services that use voice control, because selected sensitive words and/or phrases of a conversation are obfuscated. Thus, the meaning of the conversation to a third party eavesdropper can be satisfactorily diminished. Further advantages of the invention include that it is hands-free and allows for single mode fluid voice conversational interaction. A further advantage is that if the user provides the tags, there is a possibility that the speech recognition performance may be better and result in higher recognition rates than for standard tags. Moreover, the invention generates only minimal disturbance of the user's voice interaction flow.

It is clear that various embodiments described above can be combined fully or partially. Even if such combination is not mentioned in detail herein, it is intended to be considered an embodiment of the present invention.

The invention claimed is:

1. A method for providing secret information in electronic conversation by automatic speech processing of a voice input data stream, the voice input data stream originating from a talking user in electronic conversation, the method comprising:
    scanning the voice input data stream and detecting a spoken delimiter therein by an audio scan and detection unit;
    determining, by an audio substitution determination unit, a user-defined audio sample corresponding to the detected spoken delimiter, the determined user-defined audio sample comprising the secret information;
    indicating to the user that the spoken delimiter has been detected;
    inserting, by an audio insertion unit, the determined user-defined audio sample into the voice input data stream after the spoken delimiter, wherein a substituted voice data stream is obtained;
    indicating to the user when said inserting is finished, wherein speech portions of the voice input data stream before and after the inserted user-defined audio sample remain in the substituted voice data stream; and
    providing, by an audio output, the substituted voice data stream for output towards a recipient.

2. The method according to claim 1, further comprising:
    verifying, by a voice verification unit, that the voice input data stream originates from a predefined user, wherein voice characteristics of the voice input data stream are compared with voice characteristics of the predefined user, and wherein at least the step of inserting the determined user-defined audio sample is disabled if said verifying fails, and enabled otherwise.

3. The method according to claim 1,
    wherein the determined user-defined audio sample is inserted directly after the spoken delimiter into the voice input data stream, and
    wherein the method further comprises:
        replaying the determined user-defined audio sample to the talking user during said inserting.

4. The method according to claim 3, further comprising:
    detecting, by a confirmation control unit, a user intervention during said replaying and inserting; and
    upon said detecting of a user intervention, terminating said replaying and said inserting.

5. The method according to claim 3, further comprising:
    detecting, by a replay control unit, that the electronic conversation is replayed over a speakerphone at the talking user's side; and
    upon said detecting, switching off the speakerphone only during said replaying the determined user-defined audio sample.

6. The method according to claim 1,
    wherein the determined user-defined audio sample is inserted directly after the spoken delimiter into the voice input data stream, and
    wherein at least one of said indicating to the user that the spoken delimiter has been detected and said indicating to the user when said inserting is finished comprises an audible feedback signal to the user.

7. The method according to claim 1,
wherein the determining a user-defined audio sample comprises:
the audio substitution determination unit comparing the spoken delimiter with one or more tag phrases retrieved from a substitution database,
wherein the tag phrases comprise voice recordings of said user;
detecting a tag phrase that matches the spoken delimiter; and
retrieving from the substitution database at least one substitution audio sample corresponding to the detected matching tag phrase, before the determined user-defined audio sample is inserted into the voice input data stream.

8. The method according to claim 1,
wherein the substitution audio sample retrieved from the substitution database comprises speech synthesizer input data,
the method further comprising:
rendering the speech synthesizer input data by a speech synthesizer unit to obtain audio data for said substitution audio sample.

9. The method according to claim 1, wherein said inserting the substitution audio sample is performed before the substituted voice data stream is routed to the recipient.

10. A non-transitory computer-readable storage medium having stored thereon instructions that when executed on a computer cause the computer to perform a method for speech processing according to claim 1.

11. A speech processing device adapted for providing secret information in electronic conversation by processing a voice input data stream originating from a talking user in the electronic conversation, the speech processing device comprising:
an audio scan and detection unit adapted for scanning the voice input data stream and for detecting a spoken delimiter therein;
an audio substitution determination unit adapted for determining a user-defined, prerecorded audio sample corresponding to the detected spoken delimiter and comprising the secret information, and further adapted for indicating to the user that the spoken delimiter has been detected;
an audio insertion unit adapted for inserting the determined user-defined, prerecorded audio sample after the spoken delimiter in the voice input data stream,
wherein a substituted voice data stream is obtained, and wherein speech portions of the voice input data stream at least before and after the inserted audio sample remain in the substituted voice data stream, the audio insertion unit further being adapted for indicating to the user when said inserting is finished; and
an audio output for providing the substituted voice data stream towards a recipient.

12. The speech processing device according to claim 11, further comprising:
a voice verification unit adapted for verifying that the voice input data stream corresponds to the voice of a predefined user, and for enabling at least the audio insertion unit upon said verification being successful, and for disabling at least the audio insertion unit otherwise.

13. The speech processing device according to claim 11, wherein the audio insertion determination unit comprises:
a recording control unit adapted for recording the sound data of the spoken delimiter and the substitution audio sample; and
a substitution database adapted for storing user-generated sound data of at least one pair of a spoken delimiter and a corresponding substitution audio sample.

14. The speech processing device according to claim 9, further comprising:
a speech renderer unit or speech synthesizer adapted for rendering the substitution audio sample from said sound data, wherein the rendered substitution audio sample is provided at least to the audio insertion unit.

15. The speech processing device according to claim 11, wherein the spoken delimiter is removed from the substituted voice data stream, and
wherein the audio insertion unit comprises:
a delay unit adapted for delaying the voice input data stream for at least a duration of said detecting the spoken delimiter.

16. The speech processing device according to claim 11, further comprising:
a confirmation control unit, wherein the confirmation control unit is adapted for controlling the speech processing device to replay the determined user-defined, prerecorded audio sample to said user during said inserting.

17. The speech processing device according to claim 16, wherein the confirmation control unit is adapted for controlling the speech processing device to
detect a user intervention; and
upon said user intervention, terminate said replaying of the determined prerecorded audio sample to the user.

18. The speech processing device according to claim 16, further comprising a replay control unit adapted for detecting that the electronic conversation is replayed over a speakerphone at the talking user's side; and
upon said detecting, switching off the speakerphone at least during said replaying the determined user-defined audio sample.

19. The speech processing device according to claim 11, wherein at least one of said indicating to the user that the spoken delimiter has been detected and said indicating to the user when said inserting is finished comprises generating an audible feedback signal to the user.

20. The speech processing device according to claim 11, wherein said inserting the user-defined, prerecorded audio sample is performed before the substituted voice data stream is routed towards the recipient.

21. A mobile communication device comprising a speech processing device according to claim 11.

* * * * *